United States Patent [19]

Engelhardt

[11] Patent Number: 5,197,712
[45] Date of Patent: Mar. 30, 1993

[54] LEAKAGE FREE BUSHING

[75] Inventor: Reiner Engelhardt, Munich, Fed. Rep. of Germany

[73] Assignee: ZEO-TECH, Unterschleissheim, Fed. Rep. of Germany

[21] Appl. No.: 834,937

[22] Filed: Feb. 13, 1992

[30] Foreign Application Priority Data

Feb. 26, 1991 [DE] Fed. Rep. of Germany ....... 4105944

[51] Int. Cl.$^5$ .............................................. F16K 31/00
[52] U.S. Cl. ................... 251/335.3; 251/297; 251/339
[58] Field of Search ............ 251/335.3, 297, 144, 251/339; 137/625.38

[56] References Cited

U.S. PATENT DOCUMENTS

| 1,624,736 | 4/1927 | Hutt | 251/335.3 |
| 1,972,815 | 9/1934 | Anneren | 251/335.3 |
| 2,417,546 | 3/1947 | De Giers | 251/335.3 |

FOREIGN PATENT DOCUMENTS 924143 1/1955 Fed. Rep. of Germany ... 251/335.3

Primary Examiner—A. Michael Chambers
Attorney, Agent, or Firm—Hoffmann & Baron

[57] ABSTRACT

A leakage free bushing for placement through a surface of a fitting body. The leakage free bushing has flexible bellows, a moveable sealing element and a stationary sealing seat. The flexible bellows have one end connected to the fitting body in a leakage free manner while its other end is capable of an angular tilt movement with respect to the vertical axis of the flexible bellows. The moveable end of the flexible bellows are covered in order to prevent leakage. The flexible bellows have an actuating knob connected to its outer area which, when rotated, permits mechanical deflection of the bellows. In the inner area of the fitting body at the left of the bellows axis, a transmission assembly is located which transmits the mechanical deflection caused by the actuating knob to the inner space of the fitting body.

10 Claims, 3 Drawing Sheets

LEAKAGE FREE BUSHING

BACKGROUND OF THE INVENTION

1. Field of the Invention

This invention relates to leakage free bushings, and more particularly to vacuum tight valves and rotating bushings for use as fittings.

2. Description of the Prior Art

In devices which operate in accordance with vacuum technology, leakage free valves and rotating bushings have been employed for a relatively long period of time. Traditionally, such valves consist of moveable metal bellows which, in the axial direction, are stretched or elongated by a screw or tilt device so that a moveable sealing element can be separated from or pressed against a stationary sealing seat. Valves that are constructed in accordance with this principle have been customarily used as fittings when high pressure and vacuum pressure is a consideration.

A significant drawback of the traditional vacuum bushings is that they are relatively difficult to manufacture and as a result, they are significantly more expensive as compared to non-vacuum sealed fittings. A further disadvantage of the traditional vacuum bushing resides in that the medium which flows through the valve is severely deflected as it travels through the valve body. As a result, significant turbulence is generated which further increases the flow resistance and decreases the flow rate of the medium through the valve.

Furthermore, it is known to configure vacuum tight bushings having an angular movement of the bellows. Such devices are even more difficult to manufacture than the above-mentioned fittings since the angular movement must be supported by at least one fulcrum.

OBJECTS AND SUMMARY OF THE INVENTION

It is an object of the present invention to provide a leakage free bushing through a fitting body which ensures the opening and closing or maintains the opening or closing of a flow line.

It is a further object of the present invention to provide a leakage free bushing which is simple to use, inexpensive to manufacture and suitable for vacuum as well as high pressure systems.

It is another object of the present invention to provide a leakage free bushing wherein the pressure drop for the flowing medium is significantly reduced.

It is yet a further object of the present invention to provide a leakage free bushing which overcomes the inherent disadvantages of known bushings.

In accordance which one form of the present invention, a leakage free bushing is utilized for placement through a fitting body. The leakage free bushing includes flexible bellows which have a first connected end and a second moveable end. The first connected end is attached to the fitting body and the second moveable end is not connected to the fitting body so that it is able to angularly tilt with respect to the vertical axis of the flexible bellows. Attached to the second moveable end is an actuating knob for deflecting the flexible bellows. A transmission assembly is located within the inner area of the fitting body and coupled to the actuating knob. The transmission assembly is also coupled to a moveable sealing element. Therefore, when the actuating knob is rotated, the transmission means transmits a mechanical deflection to the moveable sealing element which is either moved toward or away from a sealing seat.

These and other objects, features and advantages of this invention will be apparent from the following detailed description of the illustrative embodiments thereof, which is to be read in connection with the accompanying drawings.

DETAILED DESCRIPTION OF THE PREFERRED EMBODIMENT

Figure 1:
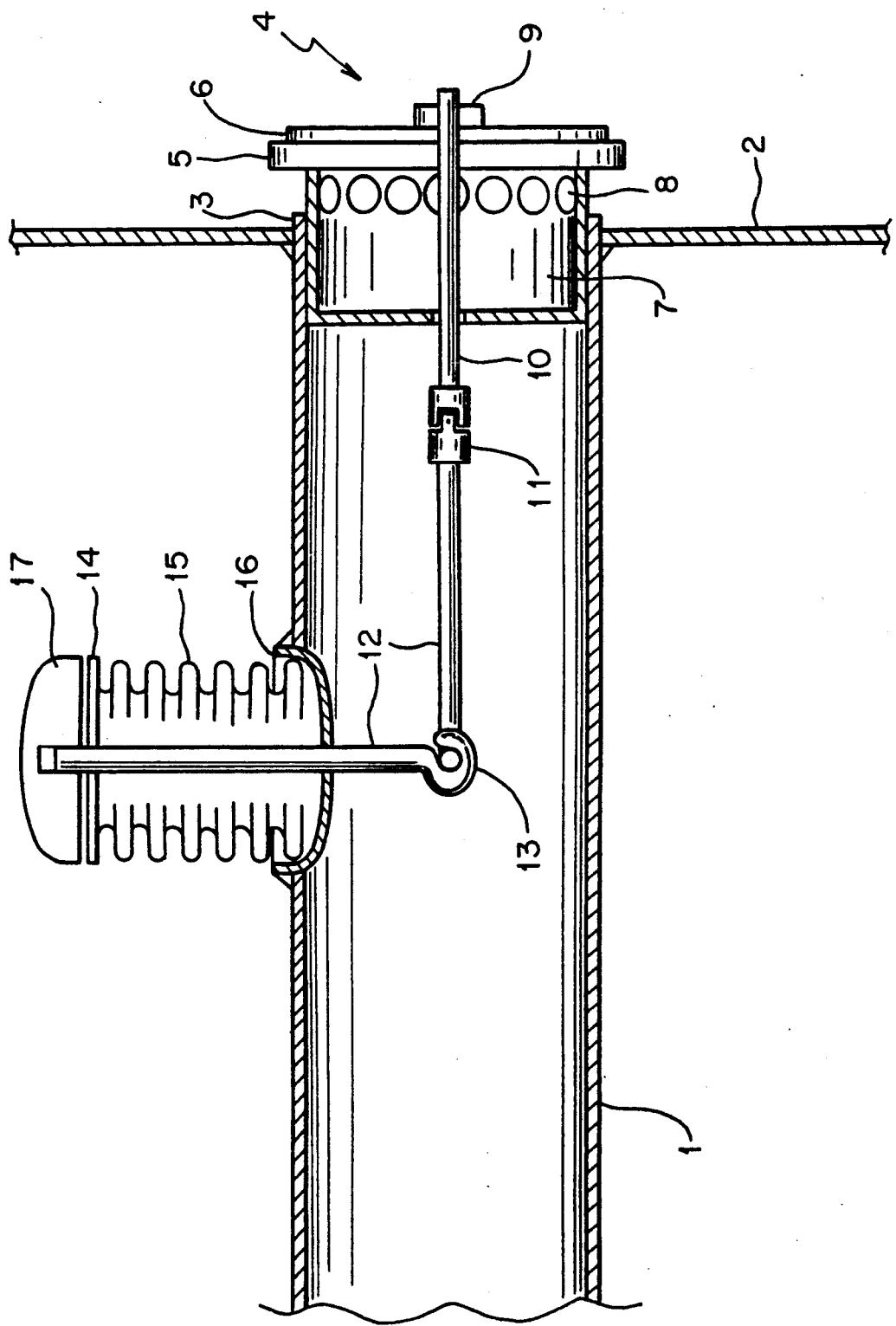
FIG. 1 is a cross-sectional view of a leakage free bushing for a valve body in accordance with the present invention.

Referring now to FIG. 1 of the drawings, a leakage free bushing constructed in accordance with the present invention will now be described. The leakage free bushing illustrated in FIG. 1 includes a pipe-shaped fitting body 1 which is soldered through a side surface 2 of a container. The right end of the pipe-shaped fitting body contains a seal seat 3. A moveable sealing element 4 is guided within the seal seat. The moveable sealing element consists of a seal 5, a pressure plate 6, a guide cylinder 7 and bores 8 provided in the flow area. In an opened condition, a liquid medium flows through the bores from the container into the pipe-shaped fitting body. The guide cylinder, seal and pressure plate are secured together by means of a nut 9 fastened onto a threaded pin 10. Through a cardan-connection 11, the threaded pin is flexibly connected with a transmission means 12. The transmission means consists of wire pieces which are in contact with each other through eyelets 13. A first end of the transmission means 12 is tensionally and vacuum tight connected with a locking plate 14. The locking plate is soldered to a moveable first end of bellows 15. A second end of the bellows is soldered to the pipe-shaped fitting body with a solder support ring 16. An actuating knob 17 is mounted to the transmission means at the side of the locking plate facing away from the bellows. In order to actuate the leakage free bushing, the actuating knob is manually rotated which displaces the bellows in an angular direction.

Figure 2:
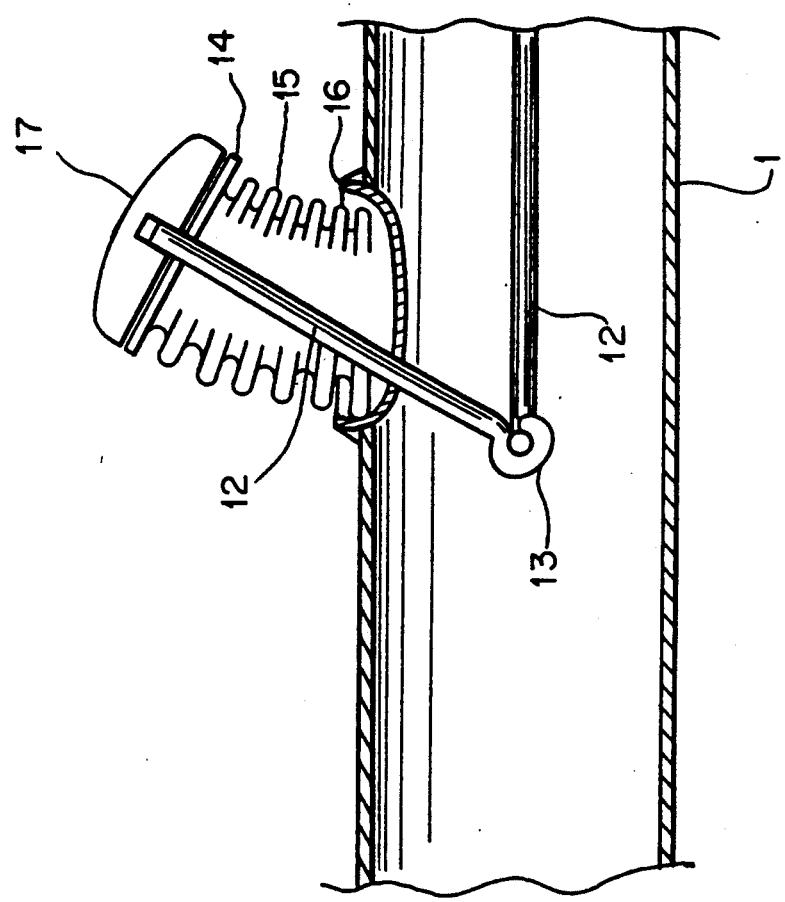
FIG. 2 is a cross-sectional view of the leakage free bushing in accordance with FIG. 1 wherein the bushing is in a deflected state.

Referring now to FIG. 2 of the drawings, the device in accordance with FIG. 1 is illustrated in a deflected position. By rotating the actuating knob 17 to the right, the bellows 15 will deflect to the right causing a leftward movement of the transmission means 12 within the fitting body 1. FIG. 2 illustrates the above identified configuration. The deflection of the bellows is transmitted by the transmission assembly to the seal seat 3, shown in FIG. 1. As a result, the seal 5 is pulled against the seal seat and the valve is in a closed position. In order to open the valve, the actuating knob must be rotated to the left into the zero position (i.e., wherein the two portions of the transmission means are substantially perpendicular) as shown in FIG. 1. By rotating the actuating knob beyond the zero position, a further opening of the moveable sealing element 4 will result.

Figure 3:
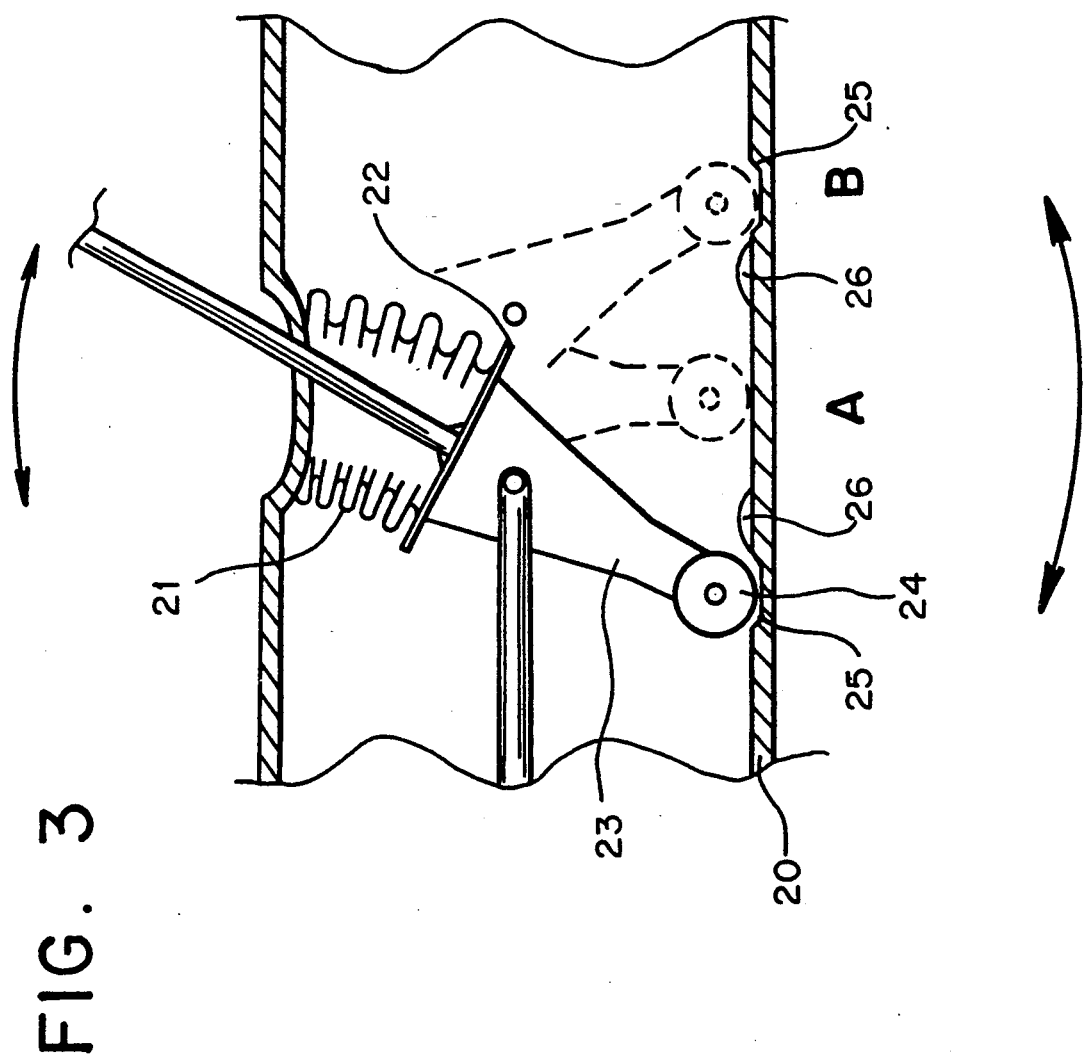
FIG. 3 is a cross-sectional view of a leakage free bushing having arresting means.

Referring now to FIG. 3 of the drawings, an alternative embodiment of the leakage free bushing is illustrated in cross-section. FIG. 3 shows, with respect to the pipe axis, one end of flexible bellows 21 soldered to a top portion of the interior of a cylindrical pipe 20. As shown, a second moveable end of the flexible bellows is contained within the inner space of the cylindrical pipe. A locking plate 22 is coupled to the moveable end of the bellows and transmits the angular rotating movement to an arresting sheet metal part 23 which engages a bottom portion of the inner side of the cylindrical pipe by means of roller 24. During angular tilting movements of the flexible bellows, the roller moves along the bottom portion of the inner side of the pipe to the left and to the right. In FIG. 3, two further positions A and B of the rollers are indicated. The bottom portion of the inner side of the cylindrical pipe is provided with indentations 25 and/or nubs 26. The rollers are pushed into the indentations by a spring force of the flexible bellows and the rollers remained fixed in an indentation. The lifting of rollers during the rolling over the nubs is performed by compression of the flexible bellows in a substantially axial direction.

One can obtain a secure opening and closing of the valve by selecting a suitable bellows material. Specifically, attention should be paid to the spring rate of the bellows. In particular, the ratio of the bellows diameter to the bellows length should be in the range of 0.5 to 2.0. By making a suitable selection of the flexible bellows spring rate, the resiliency or tension can have wide ranges and be freely selected.

In view of the above-described inventive device, it is possible to perform a longitudinal or angle change in a given plane without additional support or deflection devices. Generally, the angular movement of the bellows occurs in its vertical plane. However, it is particularly advantageous that the moveable end of the bellows be capable of being deflected from the normal vertical plane so as to enable placement in a variety of positions.

The manufacturing of the leakage free bushing of the present invention merely requires two soldering or welding procedures. The invention is designed to have one end of the bellows mounted on the fitting body and free from leakage. In addition, the free end of the bellows should be closed with a plate which is provided with a transmission pin, preferably in the axial direction of the bellows.

It has been shown that the free end of the flexible bellows may be mounted in the interior as well as the exterior of the fitting body. When an arrangement having the bellows mounted on the outside of the fitting body is utilized, the flow of a medium will not or may only be immaterially impaired by the transmitting means.

The leakage free bushing is advantageous in vacuum systems, particularly in sorption systems, wherein a supply of cold air or superheated steam must be shut off. In these applications, cross sections with a very low flow resistance are required. Since sorption systems and apparatus are very often hermetically sealed, a high degree of leakage safety is desired. The transmitting means can actuate the sealing element over a relatively long distance. As a result, it is possible to install the temperature sensitive seal in temperature protected system areas, while the bellows and the actuating elements are located in more easily accessible, but unprotected areas.

The transmission means can be inexpensively formed from pieces of wire. If the wire is made of a yielding material, a closed valve can simultaneously operate as a check valve. In particular, with regard to sorption apparatus which operate according to the ad- and desorption reaction principle, the leakage free bushing of the present invention is particularly suitable since the device must be able to be shut off the flow of an operating medium in one direction. However in the opposite flow direction and even with a closed valve, an opening of the valve during counter pressure must be possible to insure safety. Hence, according to the present invention, a valve can be constructed which completely closes in one flow direction while in the closed state it also operates as a spring loaded check valve.

Metal bellows are known, for example, from the "Taschenbuch" No. 441 of Witzenmann GmbH, D-Pforzheim. Accordingly, a plurality of fields of applications, material criterias, elasticity characteristics and load play combinations exist. Flexible bellows made of steel, brass and bronze are particularly suitable for use in the present invention. However, synthetic or rubber bellows can be advantageously employed for use in a non-vacuum device.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

I claim:

1. A leakage free bushing for placement through an exterior and interior surface of a fitting body, the leakage free bushing having flexible bellows, the flexible bellows having a first connected end and a second moveable end, the first connected end being attached to the fitting body so that the attachment is leakage free, the second moveable end being capable of performing an angular tilt movement with respect to a vertical axis of the flexible bellows, deflecting means being attached to the second moveable end so that the attachment is leakage free, the deflecting means permitting the mechanical deflection of the flexible bellows, transmission means being located within an inner area along the vertical axis of the flexible bellows, the transmission means being coupled to the deflecting means, the transmission means transmitting the mechanical deflection caused by said deflecting means, the leakage free bushing including first arresting means attached to the second moveable end, the fitting body having second arresting means on the interior surface of the fitting body adjacent to the flexible bellows, the first arresting means being capable of engaging the second arresting means so that the mechanical deflection of the leakage free bushing is temporarily fixed in a specified orientation.

2. A leakage free bushing in accordance with claim 1, wherein said transmission means is coupled to a sealing element, the transmission means being capable of moving the sealing element alternately toward and away from a sealing seat.

3. A leakage free bushing in accordance with claim 1 wherein said second moveable end of the flexible bellows extends into an inner area of the fitting body.

4. A leakage free bushing in accordance with claim 1, wherein the first arresting means utilizes a spring effect of the flexible bellows in the vertical axial direction so that the first arresting means engages the second arresting means.

5. A leakage free bushing in accordance with claim 1 wherein the first connected end is soldered to the fitting body.

6. A leakage free bushing in accordance with claim 1 wherein the first connected end is welded to the fitting body.

7. A leakage free bushing in accordance with claim 1 wherein the transmission means are flexible.

8. A leakage free bushing in accordance with claim 1 wherein the leakage free bushing is employed for use in sorption apparatus.

9. A leakage free bushing in accordance with claim 1 further comprising roller means attached to an end of the first arresting means, the roller means engaging the second arresting means.

10. A leakage free bushing in accordance with claim 1 wherein the second arresting means comprises one of indentations and nubs.

* * * * *